INVENTOR.
David Sciaky,
BY
Byron, Hume, Green & Clement
ATTYS.

Jan. 24, 1967 D. SCIAKY 3,300,618
OPTICAL VIEWING SYSTEM FOR ELECTRON BEAM WELDERS
Filed Dec. 26, 1963 3 Sheets-Sheet 2
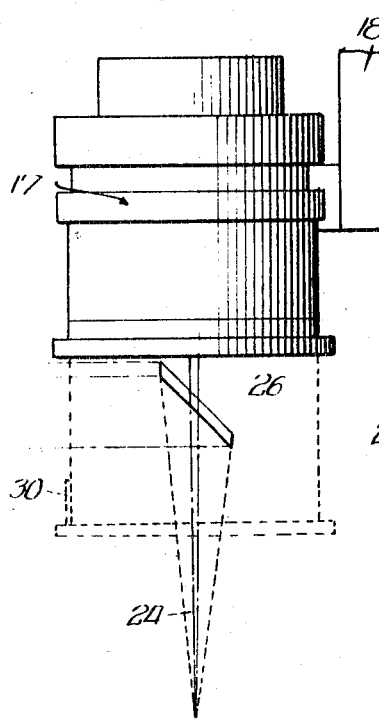
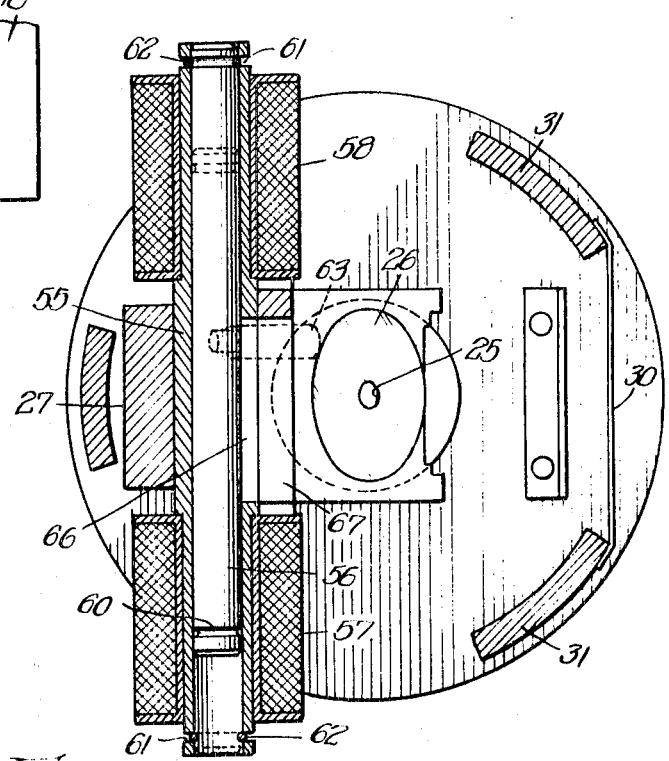
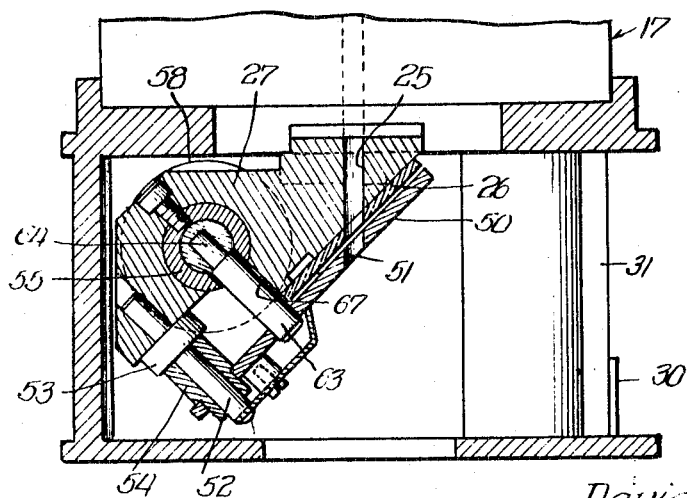
INVENTOR.
David Sciaky,
BY
Byron Hume Groen & Clement
Attys.

Jan. 24, 1967 D. SCIAKY 3,300,618
OPTICAL VIEWING SYSTEM FOR ELECTRON BEAM WELDERS
Filed Dec. 26, 1963 3 Sheets-Sheet 3

INVENTOR.
David Sciaky,
BY
Byron Hume Groen + Clement
Attys

United States Patent Office 3,300,618
Patented Jan. 24, 1967

3,300,618
OPTICAL VIEWING SYSTEM FOR ELECTRON BEAM WELDERS
David Sciaky, Chicago, Ill., assignor to Welding Research, Inc., Chicago, Ill., a corporation of Illinois
Filed Dec. 26, 1963, Ser. No. 333,493
5 Claims. (Cl. 219—121)

The invention relates generally to electron beam welders and has reference, more particularly, to an optical system for electron beam welders for effecting accurate work alignment from outside the vacuum chamber housing the electron beam gun.

When employing an electron gun in the welding of metals, the operation is carried out in a sealed chamber under a high vacuum. The workpieces are generally supported within the chamber on a carriage adapted to have movement in the direction of the seam to be welded. The electron gun is also supported within the chamber by a separate and independent carriage, the said gun carriage, however, having movement transversely, that is, at a direction at right angles to the seam to be welded. It is, therefore, necessary to provide accurate and reliable means for correlating the electron beam gun with the seam to be welded and in a manner which will enable the operator to view the welding operation under magnification and from outside the vacuum chamber.

One of the basic objects of the invention, therefore, is to provide an optical system for electron beam welders which would enable the operator to align the workpieces with the electron beam projected by the gun so that when the workpieces are moved relative to the gun, the electron beam will track the seam to be welded.

Another object of the invention is to provide a system having optical magnification whereby to assist the operator in work alignment by locating a point at which the beam impinges upon the work in relation to a selected point on a fixed reference scale that can be viewed from outside the chamber.

Another object of the invention resides in the provision of an angled mirror fixed to the electron gun and having an aperture through which the electron beam is projected in combination with a telescope mounted exteriorly of the vacuum chamber for horizontal and vertical adjustment and which, in combination with the mirror, will enable the operator to view the welding of the workpieces during the operation.

Another object is to provide shutter mechanism which will be electrically actuated from outside the vacuum chamber to and from an operative and inoperative position with respect to the mirror, the shutter mechanism shielding the mirror when in operative position from the vapors produced in the weld area during the welding operation.

With these and various other objects in view of the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 2 is a view of electron gun showing schematically the angled positioning of the mirror for viewing the welding operation;

FIGURE 3 is a horizontal sectional view showing the solenoid type of magnetic means employed for actuating the shutter mechanism for shielding the mirror;

FIGURE 4 is a vertical sectional view taken substantially along line 4—4 of FIGURE 3;

Figure 1:
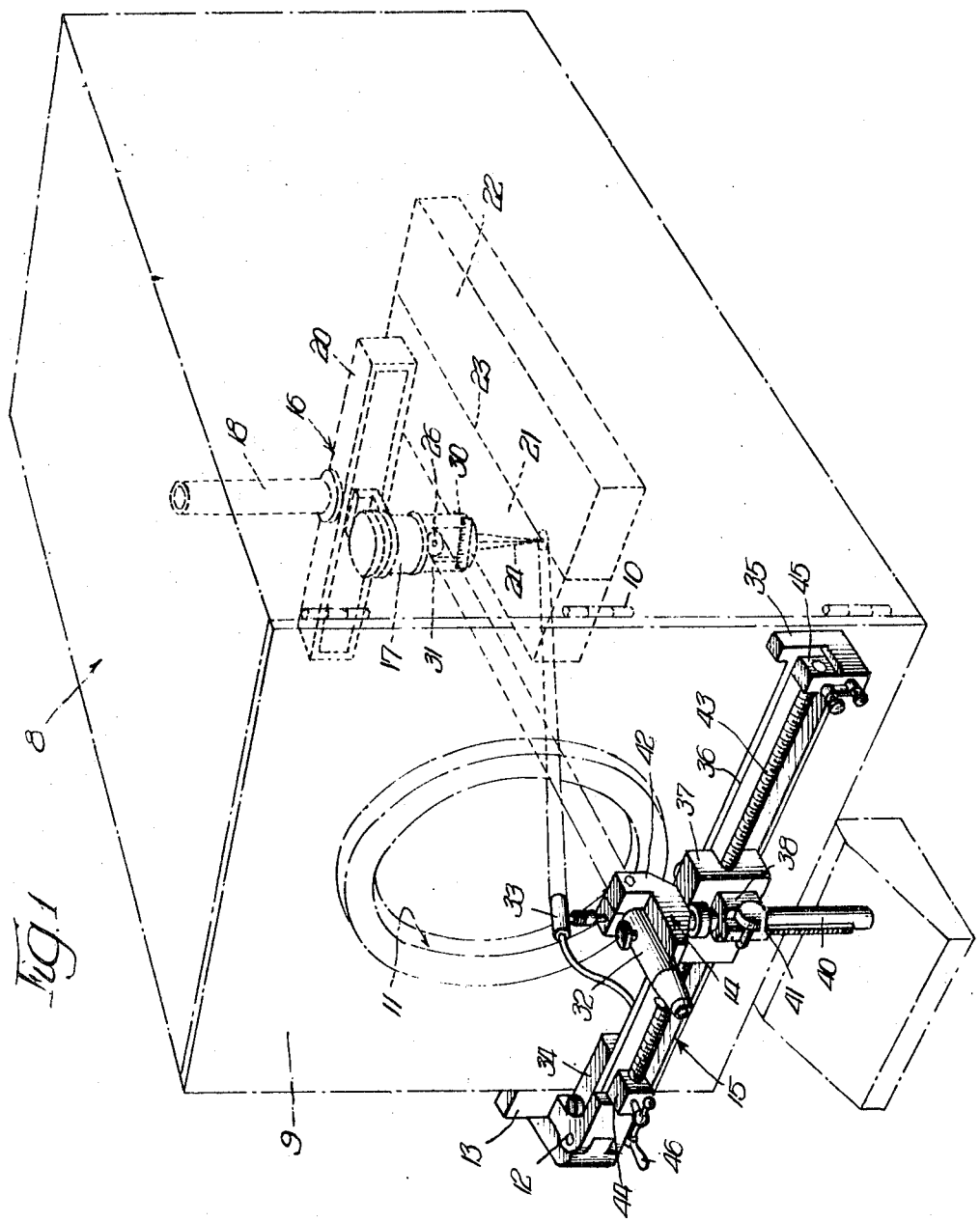
FIGURE 1 is a perspective view showing the optical system of the invention as applied to a vacuum chamber housing an electron gun and workpieces to be welded.

In FIGURE 1 the vacuum chamber is diagrammatically illustrated by dotted lines as a rectangularly shaped enclosure 8 having a front door 9 hinged to the enclosure at 10 and having a circular glass window or port 11. The combination viewing telescope and light source 14 is adjustably carried by the structure 15 pivotally secured at 12 to the bracket 13 which is fixed to a side wall of the enclosure. The pivot mounting 12 on the bracket 13 permits independent swinging movement of the unitary structure 15 and thus the same can be operatively positioned when the door 9 is open as well as when the door is closed. Within the vacuum chamber the adjustable assembly 16 supports the electron beam gun 17. The depending support 18 is capable of vertical up and down movement and the member 20 supports the gun for movement in a horizontal direction. The workpieces 21 and 22 to be welded along the seam 23 are also suitably supported within the vacuum chamber 8 by carriage structure, not shown, but which provides for movement of the workpieces in a longitudinal direction. For a more particular description of the chamber and the adjustable structures for supporting the electron beam gun and for supporting the workpieces reference is made to Patent No. 3,112,391, granted November 26, 1963, to David Sciaky, for "Zeroing System for Electron Gun."

The electron beam 24 projected by the gun 17 passes through the bore 25 which terminates approximately centrally of the angularly disposed mirror 26 supported by the body portion 27 of the gun. The said body portion consists of nonmagnetic material such as brass. From the bore 25 the electron beams travels downwardly to the workpieces and effects a welding of the workpieces along the seam 23. The mirror is retained in place by the clips 28 and 29 which permit convenient release of the mirror for cleaning and polishing. In accordance with the invention the scale 30 is supported by the depending members 31 and is conveniently located in front of the mirror 26 so that both the mirror and the scale can be viewed by the telescope in a manner which will now be described.

The bracket assembly 15 which adjustably supports the telescope 32 and the light source 33 is conveniently mounted by the support brackets 34 and 35. Said brackets in turn support the transverse member 36, and the transversely movable block 37 is adapted to ride on said transverse member. The block 37 carries the member 38 which receives the rack bar 40. Rotation of the knob 41 will effect vertical movement of the rack bar 40, and thus vertical movement is imparted to the viewing telescope 32, since the telescope is fixed by the clamping block 42 to the top projecting end of the rack bar. For effecting travel of the viewing telescope 32 in a horizontal direction the threaded rod 43 is provided, and which is suitably journalled at its respective ends in the blocks 44 and 45. The rod 43 has threaded relation with the block 37 and rotation of the rod is effected by actuation of the crank handle 46. The light source 33 is conveniently supported on the clamping block 42 and both the telescope and said light source may be directed for viewing the mirror 26 through the glass window 11 when the door 9 is closed. Also, when the door is open the telescope and light source may be positioned for viewing the workpieces and the seam in order that the parts may be properly oriented.

The bracket assembly 15 is preferably provided with accurately machined ways and high quality screw mechanisms for moving the telescope 32 across the full width of the window 11 with maximum precision and accuracy. Also, the rack bar 40 and operating pinion mechanism requires high quality in the machining of the parts so that vertical movement of the telescope for the full height of the window 11 may be effected in an accurate manner.

The front door 9 is opened by the operator and the parts to be welded, such as 21 and 22, are placed on the carriage provided therefor within the vacuum chamber 8. The workpieces are so oriented that the joint or seam 23 to be welded can be moved in a longitudinal direction as clearly illustrated in FIGURE 1. Also, the workpieces are so positioned within the vacuum chamber as to locate the seam approximately in line with the electron beam gun 17. With the door 9 open the telescope is positioned in line with the mirror 26 and which will permit the operator to view the weld area through the mirror all in the manner as diagrammatically illustrated in FIGURE 2. The telescope is adjusted so that one of the cross hairs falls along the seam 23. The carriage for the workpieces is then moved and the seam to be welded is viewed through the telescope for its entire length. Any misalignment of the seam is readily noticed with respect to the cross hair of the telescope and adjustments are made in the position of the work so that the seam is always under the cross hair for the full length of travel of the workpieces.

The front door 9 is now closed and the chamber 8 is evacuated to produce a high vacuum within the same. Following the pumpdown operation the electron beam gun 17 is energized momentarily so as to produce a spot on a piece of scrap metal placed at one end of the workpieces. This spot is viewed through the telescope and the telescope is adjusted in horizontal and vertical directions until the intersection of the cross hairs lies directly over the spot. The vertical cross hair of the telescope is then focused on the reference scale 30 mounted on the gun. The reference number on the scale gives the position of the electron beam where it impinges upon the work in relation to the gun. The telescope is now positioned so that the vertical cross hair is lined up with the seam 23 to be welded. The electron gun is moved along the horizontal axis until the vertical cross hair of the telescope also coincides with the reference numeral previously noted on the reference scale 30. The work is now jogged until the cross hairs are lined up with the point at which the weld is to be started and the electron beam gun is energized for the welding operation. Since the mirror can be exposed for viewing during the welding operation the operator is able to view the work at any time. In special cases and when desirable the entire welding operation from beginning to end can be followed under magnification through the telescope.

During the welding operation vapors are generated in and around the welding area, and these vapors will be deposited upon the mirror which will eventually darken the mirror, the time interval depending upon the material being welded. The mirror can be removed, cleaned and replaced. However, it is desirable to provide shutter mechanism for protecting the mirror during the welding operation and mechanism of this character is shown in detail in FIGURES 3 to 6, inclusive.

Figure 5:
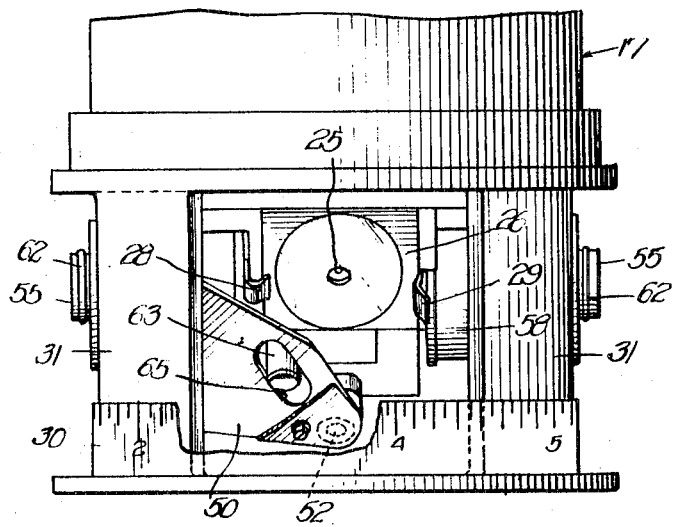
FIGURE 5 is a fragmentary front elevational view of the electron gun showing the pivoted displaced position of the shutter mechanism which renders the mirror free for viewing.
Figure 6:
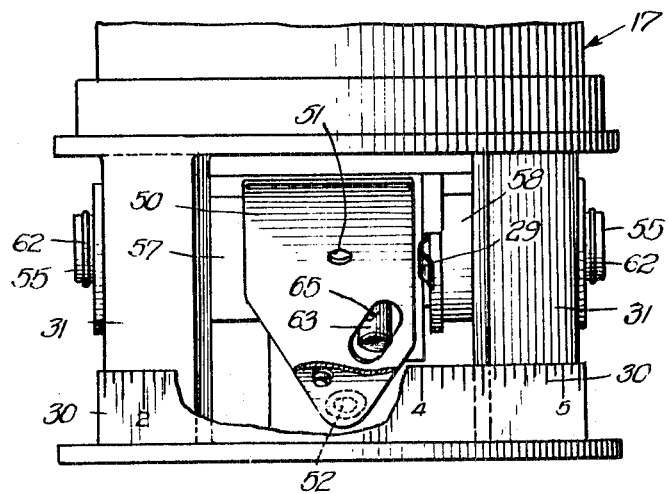
FIGURE 6 is a view similar to FIGURE 5 but showing the shutter mechanism in closed position for shielding the mirror.

The numeral 50, FIGURES 4, 5 and 6, indicates the shutter which is adapted to have a closed and an open position with respect to the mirror 26. When in closed position the shutter has a close covering relation with the mirror and it will also be observed that the central aperture 51 in the shutter is in alignment with the bore 25 formed in the body portion of the gun. The aperture permits the passage and projection of the electron beam from the bore to the workpieces even though the shutter may be closed. The body portion 27 is provided with the pivot stud generally designated by numeral 52 and which projects downwardly and outwardly from this part of the gun. A retaining ring 53 is mounted on the pivot stud and said ring retains in position the gearing 54 to which the shutter 50 is secured. The pivot stud 53 is located below the mirror 26 and in approximate alignment with the bore 25, all as best shown in FIGURES 5 and 6. Accordingly, when the shutter is located in a closed position the mirror is shielded and protected from the vapors produced during the welding operation. However, even with the shutter in closed position the electron beam from the gun can pass through the aperture 51 so that the welding operation can continue.

At times during the welding operation it is desirable for the operator to view the seam 23 and check on the progress of the welding action. For this purpose the invention provides reciprocable means controllable from outside the vacuum chamber for oscillating the shutter to and from closed and open positions. The reciprocable means is preferably of the solenoid type as shown in FIGURE 3, and thus the shutter 50 can be electrically actuated. A tube 55 of non-magnetic material such as brass is supported horizontally by the body portion 27 and the tube has sufficient length to extend beyond the body portion on each side of the same as clearly evident from FIGURE 3. The brass tube 55 contains the slidable iron plunger 56 and thus the tube can be described as having telescoping relation with the plunger. Each extending end of the brass tube carries a coil of wire designated by the numerals 57 and 58, and which form electromagnetic means with respect to the iron plunger 56 for reciprocating the same. The plunger at each end thereof is provided with a groove 60 and each end of the brass tube is notched at 61 for retaining a spring clip such as 62.

The reciprocating movements of the plunger 56 are conveniently applied to the shutter 50 to effect the desired oscillating movement of the shutter by means of the pin 63. Said pin is fixed to the iron plunger by the reduced end portion 64 of the pin, and it will be observed that said pin extends forwardly and downwardly so that its opposite extending end projects into and through the oblong slot 65 formed in the shutter. To permit reciprocating movement of the pin 63, the tube 55 is provided with the slot 66 and the body portion 27 is also slotted as at 67 to accommodate reciprocating movements of the pin as the iron plunger 56 is caused to reciprocate for oscillating the shutter.

When the solenoid 58 is energized the plunger 56 is attracted to the right hand end, FIGURE 6, and the groove 60 at said end of the plunger will be engaged by the spring clip 62, thus retaining the plunger in position. Accordingly, the shutter 50 as shown in FIGURE 6 is located in closed position with respect to the mirror 26. However, when solenoid 57 is energized the plunger will be reciprocated to the left hand end of the brass tube and here again the groove 60 at said end will engage the clip 62 so that the plunger is thus held in said reciprocated position. Thus by energizing the solenoid 57 the shutter will be oscillated into an open position as shown in FIGURE 5.

With the mirror having an angular positioning of precisely forty-five degrees, the joint or seam 23 as provided by the workpieces can be observed with magnification before, during and following the welding operation. The light source 33 will assist the operator in observing the seam, since the light is also reflected by the mirror onto the weld area. The telescope, light source and shutter mechanism are all controllable and operable from outside the vacuum chamber.

If several welds are to be made at different locations on the workpiece, the telescope is positioned so that the cross hairs coincide with the spot at which the weld is to be started. The electron beam gun is then moved along the horizontal axis until the vertical cross hair coincides with the reference numeral previously noted on the reference scale. The gun is then energized for the welding operation and the process is repeated until all of the welding is accomplished during a single pump-down.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In welding apparatus employing an electron beam gun. the combination with a vacuum chamber within which said gun is mounted for adjustable movement in vertical and horizontal directions, carriage means also located within the vacuum chamber for supporting workpieces for movement horizontally and in a direction parallel to the seam as formed by the workpieces and which seam is to be welded, of an optical system for viewing the seam before, during and following the welding operation, said optical system including a telescope mounted exteriorly of the vacuum chamber and a mirror carried by the gun and mounted thereon at an angle of approximately forty-five degrees, said mirror having an aperture therein whereby to permit the passage of the electron beam projected by the gun during the welding operation, a shutter having a closed position for shielding the mirror from the vapors produced during the welding operation, means mounting said shutter on the gun for pivotal movement to and from closed and open positions, and electric means for actuating the pivotal shutter to effect oscillating movement of the same.

2. In welding apparatus as defined by claim 1, wherein said electric means for actuating the shutter includes a tube of non-magnetic material supported by the body portion of the gun, a solenoid at each end of the tube in supported relation thereon, a plunger of magnetic material within the tube and adapted to have reciprocating movement from one end of the tube to the other as the solenoids are alternately energized, and means operatively connecting the plunger with the pivotal shutter.

3. In welding apparatus employing an electron beam gun, the combination with a vacuum chamber within which said gun is mounted for adjustable movement in vertical and horizontal directions, means also located within the vacuum chamber for supporting workpieces for movement horizontally and in a direction parallel to the seam as formed by the workpieces and which seam is to be welded, of an optical system for viewing the seam before, during and following the welding operation, said optical system including a viewing device mounted exteriorly of the vacuum chamber, a carriage for supporting the viewing device for adjustable movement in vertical and horizontal directions, bracket means for pivotally securing the carriage to one side wall of the vacuum chamber, a front door pivoted to the other side wall of the vacuum chamber, a mirror carried by the gun and mounted on the gun at an angle of approximately forty-five degrees, said mirror having an aperture therein whereby to permit passage of the electron beam projected by the gun during the welding operation, and said door having a glass window whereby to permit viewing of said mirror and the seam through the glass window when the door is closed.

4. In welding apparatus as defined by claim 3, additionally including a light source also having a supported relation on the carriage and being located relatively adjacent the viewing device.

5. In welding apparatus employing an electron beam gun, the combination with a vacuum chamber within which said gun is mounted for adjustable movement in vertical and horizontal directions, said vacuum chamber having a pivoted front door and which is provided with a glass window, means also located within the vacuum chamber for supporting workpieces for movement horizontally and in a direction parallel to the seam as formed by the workpieces and which seam is to be welded, of an optical system for viewing the workpieces and thus the seam from outside the vacuum chamber, said optical system including a mirror carrier by the gun and mounted thereon at an angle of approximately forty-five degrees, said mirror having an aperture therein whereby to permit the passage of the electron beam projected by the gun during the welding operation, and said optical system also including a viewing device mounted exteriorly on the vacuum chamber and having such association with the vacuum chamber and with the door that the seam can be viewed before the welding operation with the door open and can also be viewed through the window during and following the welding operation with the door closed.

References Cited by the Examiner

UNITED STATES PATENTS

| | | | |
|---|---|---|---|
| 2,932,720 | 4/1960 | Stohr | 219—72 |
| 3,020,389 | 2/1962 | Gorman | 219—72 |
| 3,033,974 | 5/1962 | Schleich et al. | 219—117 |
| 3,112,391 | 11/1963 | Sciaky | 219—124 |
| 3,156,809 | 11/1964 | Stearns | 219—121 |
| 3,156,810 | 11/1964 | Samuelson | 219—121 |

OTHER REFERENCES

"Electron Beam Welding," Sciaky Bros., Inc., 4915 W. 67th St., Chicago, Ill., Bulletin No. 344, publ. April 1961.

JOSEPH V. TRUHE, *Primary Examiner.*

ANTHONY BARTIS, *Examiner.*